United States Patent [19]

Badin et al.

[11] Patent Number: 5,243,632
[45] Date of Patent: *Sep. 7, 1993

[54] PROCESS FOR FILTERING A LIQUID CIRCULATING IN THE COOLING CIRCUIT OF A NUCLEAR REACTOR

[75] Inventors: Jean Badin, Athis-Mons; Collin Olivier, Paris, both of France

[73] Assignee: Framatome, Courbevoie, France

[*] Notice: The portion of the term of this patent subsequent to Apr. 7, 2007 has been disclaimed.

[21] Appl. No.: 62,392

[22] Filed: Jun. 15, 1987

[30] Foreign Application Priority Data

Feb. 8, 1985 [FR] France ................ 85 01817

[51] Int. Cl.$^5$ ............................................. G21C 19/42
[52] U.S. Cl. ............................ 376/313; 210/767; 210/805; 210/451; 210/483; 210/499
[58] Field of Search ................ 376/249, 277, 313; 210/767, 805, 167, 499, 232, 348, 435, 451, 483, 497.01

[56] References Cited

U.S. PATENT DOCUMENTS

| 2,202,403 | 5/1940 | Sandberg | 210/448 |
| 3,448,859 | 6/1969 | Hall et al. | 210/499 |
| 3,737,978 | 6/1973 | Rathbun | 228/200 |
| 4,096,032 | 6/1978 | Mayers et al. | 376/313 |
| 4,255,235 | 3/1981 | Dubourg | 376/313 |
| 4,446,099 | 5/1984 | Schwind et al. | 210/232 |
| 4,644,880 | 5/1987 | Bryan | 376/313 |
| 4,716,012 | 12/1987 | Gasparro et al. | 376/313 |
| 5,024,806 | 6/1991 | Cioffi et al. | 376/313 |

FOREIGN PATENT DOCUMENTS

| 723922 | 8/1942 | Fed. Rep. of Germany . |
| 2517479 | 12/1975 | Fed. Rep. of Germany . |
| 1173772 | 3/1959 | France . |
| 2163879 | 7/1973 | France . |
| 2280178 | 2/1976 | France . |
| 2413757 | 7/1979 | France . |
| 637759 | 5/1950 | United Kingdom . |
| 1419780 | 12/1975 | United Kingdom . |

Primary Examiner—Peter Hruskoci
Assistant Examiner—Robert James Popovics
Attorney, Agent, or Firm—Pollock, Vande Sande & Priddy

[57] ABSTRACT

Device for filtering a liquid circulating in the cooling circuit of a nuclear reactor, comprising a support (6) to be attached to the core-supporting plate (1) of the reactor, a metal grating (10) retained on the support, and a bearing device (12,13,14) for the central part of the grating (10) fixed to the support (6). The grating (10) consists of a network of intersecting wires in the form of a spherical dome. It is obtained by stamping a flat grating, the wires of which have previously been brazed to one another at each of the nodes of the network.

3 Claims, 1 Drawing Sheet

PROCESS FOR FILTERING A LIQUID CIRCULATING IN THE COOLING CIRCUIT OF A NUCLEAR REACTOR

FIELD OF THE INVENTION

The invention relates to a device for filtering a liquid circulating in the cooling circuit of a nuclear reactor, during hot-running tests on the reactor before it is commissioned, and to a process for producing this device.

BACKGROUND OF THE INVENTION

Before a pressurized-water nuclear reactor is commissioned, tests are conducted, and during these the primary water circuit is filled at ambient temperature and then at the operating temperature of the reactor. This water is circulated through the entire primary circuit, using the pumps circulating the pressurized water for cooling the reactor. These tests are carried out before the reactor core is loaded and, in particular, make it possible to eliminate all metallic or similar particles which originate from the operations of manufacturing and assembling the entire primary circuit of the reactor and which are still located in this circuit after it has been assembled. In fact, in spite of the great precautions taken during the machining and assembly of the elements of the vessel, it is not possible to prevent the presence in this vessel of small metallic particles which it is absolutely essential to eliminate before the reactor is commissioned.

Filtration devices, through which passes the water circulating in the primary circuit during the tests, particularly during the hot-running tests of the reactor, are therefore arranged in this primary circuit. Such filtration devices make it possible to stop the circulating particles which are retained either on the filter itself or immediately upstream of the filter.

It is known to eliminate the particles of a size larger than $3 \times 10^{-3}$ m at the inlet of the core at the level of the porting plate intended for receiving the core assemblies.

French Patent 2,280,178 describes a modular filtration device comprising a support allowing it to be fastened to the lower plate of the core of a pressurized-water nuclear reactor in place of a fuel assembly. This filtration device has a grating fastened to the support so as to be inserted in the circulation path of the water passing through the lower plate of the reactor core via the holes provided in this plate for the passage of the reactor cooling fluid. This grating makes it possible to stop at the entrance of the core the particles which may be transported by the water during the tests. Each of the assembly positions is occupied by a filtration device, with the result that the entire flow of water circulating in the primary circuit during the tests on the reactor is subjected to filtration. The grating of the filtration devices usually consists of a fine-mesh metal gauze made of stainless steel resting on a flat grating, the meshes of which are of larger dimensions than the meshes of the gauze and which has fairly high rigidity because it is produced from a wire of relatively large diameter of the order of $2 \times 10^{-3}$ m. Moreover, the circular central part of the grating bears on a yoke integral with the support of the filtration device. It is necessary, in fact, for the grating to be capable of withstanding substantial forces attributed to the very high circulation speed of the fluid during the tests.

However, it has been observed, during the use of such devices, that the gratings undergo considerable wear which can result in their fracture during prolonged tests. In fact, the circulation of water passing through the gratings causes the latter to flap, thus resulting in impacts between the metal gauze and the supporting grating.

These impacts cause considerable wear and fracturing of the gratings.

When a simple metal gauze is used as a filtration element, the mechanical strength of this element is diminished, and wear and breaking of wires of the metal gauze are observed at the central bearing support. This excessive wear is attributed to the friction and fatigue of the wires at the nodes of the network.

On the other hand, the passage cross-section of the flat gratings, which corresponds to the cross-section of the filtration elements, is necessarily reduced, the more so, the finer the mesh of the network and the larger the diameter of the wire constituting the grating.

It has been proposed to increase the passage cross-section of the filtration elements by the use of conical or elliptical gratings, but in this case the directional deflection of the streams of fluid passing through the filtration element is very great, and this is particularly detrimental in the case of modular devices arranged next to one another according to a closely set network corresponding to the network of assemblies of the reactor core. The various streams of fluid passing through the filtration devices then interfere with one another and considerably disturb the circulation of water in the reactor vessel.

SUMMARY OF THE INVENTION

The object of the invention is, therefore, to propose a device for filtering a liquid circulating in the cooling circuit of a nuclear reactor, during the hot-running tests on the reactor before it is commissioned, comprising a support for fastening the device to the core-supporting plate of the reactor in place of a fuel assembly, a metal grating retained on the support so as to be inserted in the path of the circulating liquid at the entrance of the core, and a bearing device for the central part of the grating fixed to the support, this filtration device having a high mechanical strength and a high wear resistance, introducing into the path of the circulating liquid a limited loss of pressure only, and causing only a slight directional deflection of the streams of fluid passing through the grating.

For this purpose, the grating consists of a network of intersecting wires fixed to one another at each of the nodes of the network, the latter having the form of a spherical dome obtained by the distortion of a flat grating, the wires of which have previously been brazed to one another.

The invention likewise relates to a process for producing the filtration device.

BRIEF DESCRIPTION OF THE DRAWINGS

In order that the invention may be more clearly understood, a filtration device according to the invention, which can be used during hot-running tests carried out on a pressurized-water nuclear reactor, will now be described by way of nonlimiting example, with reference to the attached drawings, in which.

DETAILED DESCRIPTION

Figure 1:
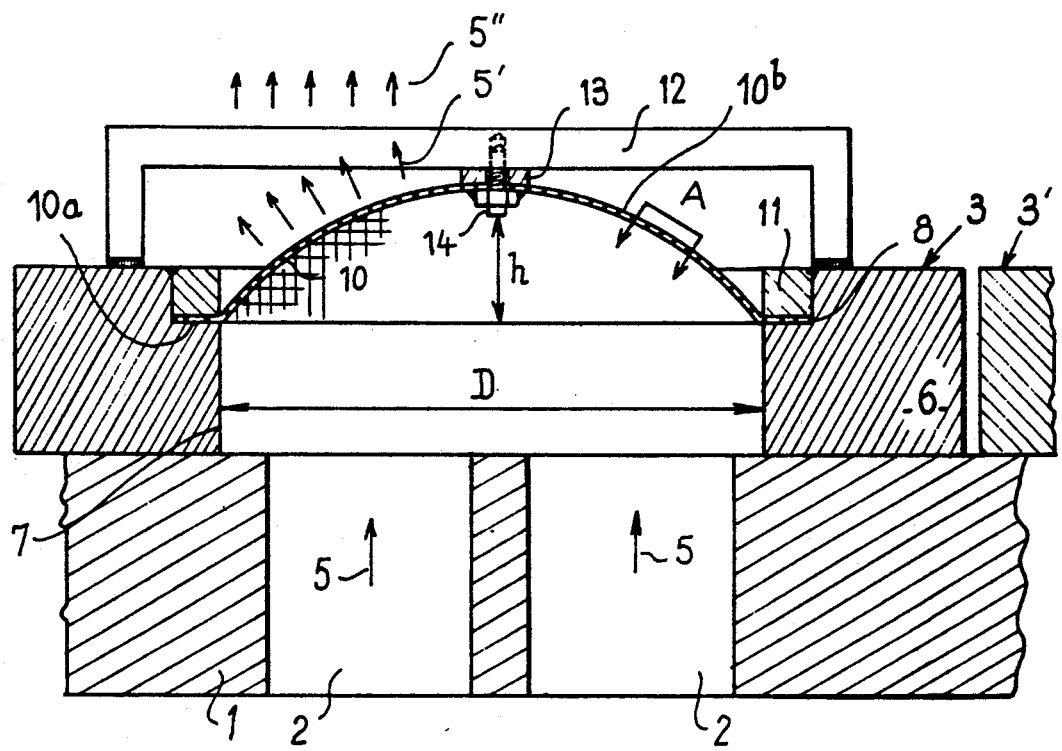
FIG. 1 is a vertical sectional view of a filtration device in position on the lower core plate of a pressurized-water nuclear reactor.

FIG. 1 shows part of the lower core-supporting plate 1 of a pressurized-water nuclear reactor, this plate being perforated with water passage holes, such as 2, at each of the assembly positions, the core assemblies coming to rest on the upper face of the plate 1 during the loading of the reactor. During the hot-running tests on the reactor, a filtration device, such as the device 3 shown in FIG. 1, takes up a position reserved for a fuel assembly during the normal operation of the reactor. Each of the assembly positions is occupied by a device such as the device 3. Part of a modular device 3' adjacent to the device 3 on the plate 1 has been shown by way of example. The water circulating in the primary circuit of the reactor arrives under the supporting plate 1 and passes through this plate via the holes 2, in the direction of the arrows 5.

The filtration device 3 has a support or base 6, the cross-section of which is square and the dimensions of which are those of a fuel-assembly base. A circular central orifice 7 extends through this support 6 and is positioned above the orifices 2 in the supporting plate 1 when the filtration device is installed in the reactor vessel. In its upper part, the orifice 7 has a portion of larger diameter 8, into which fits the flat outer edge 10a of the filtration grating 10. This grating 10 is retained in place on the support 6 by means of a circular retaining ring 11 which is welded over its periphery to the support 6.

Figure 1A:
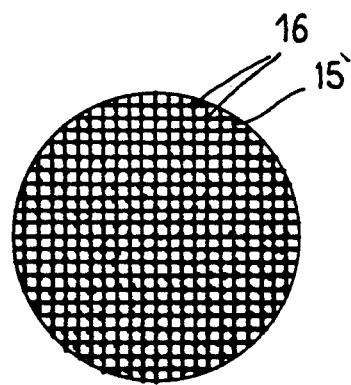
FIG. 1a is a partial view of the grating according to AA of FIG. 1.

The grating 10, which will be described in more detail with reference to FIGS. 1 and 1a, is in the form of a spherical dome and in its central part bears by means of a bearing piece 13 on a yoke 12 welded to the upper surface of the support 6. For this purpose, a screw 14 passing through the grating 10, in its central part, is screwed into a matching tapped hole in the piece 13 and then fastened in position by means of welding.

With reference to FIGS. 1 and 1a, it will be seen that the grating comprises the flat annular peripheral part 10a, the outer contour of which is circular, and a central part 10b, the base of which has the same diameter as the orifice 7 and the height h of which is equal to one quarter of the diameter of the base.

It will be seen in FIG. 1a that the grating consists of woven wires 15 intersecting at right angles and fixed to one another by means of brazing at each of the nodes 16 of the network.

The process for producing the grating and the filtration device according to the invention will now be described.

A metal gauze consisting of Type 304 stainless-steel wires with a diameter of $1 \times 10^{-3}$ m, which are woven in the form of a network, the square mesh of which has a passage aperture measuring $2 \times 10^{-3}$ m on each side, is used. A disc, the diameter of which is greater than the diameter D of the central orifice 7 in the support provided for the filtration device, is cut out from this metal gauze. The metal gauze then undergoes a brazing of the type known by the name NICROBRAZ (Registered Trademark), so that each of the wires 15 is fixed to all the wires which it intersects at right angles, at each of the nodes 16. Brazing can, for example, be carried out at high temperature, followed by quenching of the metal gauze, for example according to the brazing process NICROBRAZ (Registered Trademark) or any other high-temperature brazing process, followed by hyperquenching.

The brazed metal gauze is subsequently placed on a die-stamping installation, so that its outer peripheral edge intended to constitute the flat bearing surface 10a is gripped by a clamping jaw. A spherical stamping tool makes it possible to obtain the spherical dome shape of the part 10b by means of the stamping of the gauze, as a result of which each of the wires 15 constituting it is drawn. The stamping operation is carried out in such a way that the brazing spots at the nodes 16 of the network are not damaged, distortion being obtained solely as result of the elongation of the wires 15, thus causing hard-drawing.

The grating 10 is then mounted on a specially machined support 6 by means of the ring 11 which is welded to the support 6 for the retention of the grating 10. The yoke 12 is then fastened to the support 6, and the screw 14 is engaged into the central bearing support 13 fixed to the yoke 12 and is then immobilized by means of welding.

The device 3 is installed on the core-supporting plate 1 at the same time as other similar devices 3', in positions which each correspond to an assembly position on the plate 1.

The tests lasting 17 hours were carried out in such a way that a flow of water of 0.2 m³ per second passed through each of the filtration devices.

It will be seen from FIG. 1 that, during the tests, the stream of water 5' passing through the grating 10 is deflected slightly, the deflection becoming slightly more pronounced towards the periphery of the grating 10. However, this deflection remains very limited, and the outflowing stream 5" is straightened very quickly, with the result that the streams of fluid passing through each of the filtration devices 3, 3', etc., scarcely interfere with one another at all.

At the end of the tests, a very slight bulging of the grating was observed, but no appreciable wear or any breakage of its wires.

It was possible to measure, in the vicinity of the test flow, a pressure loss coefficient $K = \Delta P/Q$ (with $\Delta P$ being the pressure loss and Q the flow rate) which was a little less than 10.

Comparative tests were carried out with a grating which was brazed, but not stamped, and with a grating consisting of a perforated and stamped sheet.

The flat grating consisted of a metal gauze identical to that used to produce the filtration grating in the form of a spherical dome according to the invention, and the stamped perforated sheet was a Type 304 stainless-steel sheet with a thickness of $10^{-3}$ m, perforated with holes of $2 \times 10^{-3}$ m with a center-to-center distance of $3.5 \times 10^{-3}$ m, then stamped to a depth equal to one quarter of the diameter of the filter element.

The flat grating has a pressure loss coefficient a little greater than 10. At the end of the test, this grating showed considerable distortion and almost complete tearing in the region of its central part bearing on the yoke.

The grating consisting of a stamped perforated sheet did not show any appreciable distortion, but its pressure loss coefficient was in the vicinity of 18, i.e., practically twice as high as that of the device according to the invention comprising a brazed and stamped metal gauze.

It will therefore be seen that the main advantages of the device according to the invention are that it is very simple and can be produced very easily, causes only slight deflection of the stream passing through it and only a limited pressure loss, and finally shows only slight distortion and negligible wear after a long period of use.

In particular, the hardening and increase in mechanical resistance of the wires of the metal gauze as a result of hard-drawing during the stamping operation make it possible to consider using the device according to the invention in cases where the arrangement of the orifices upstream of the filtration device is responsible for the occurrence of zones of high speed in the stream of circulating liquid and consequently considerable local erosion.

It is possible to consider the use of gratings in a form slightly different from that described; the height/diameter ratio of the spherical dome can be a little different, but there should not be too great a deviation from the ratio of one quarter, in order to preserve the advantages of the increase in the passage surface of the grating and distortion by means of stamping, while at the same time limiting the deflection of the stream passing through the grating. It is possible for the grating to bear centrally on a yoke or any other bearing piece integral with the support in another way.

The grating can be shaped by means of an operation different from die-stamping or free stamping, so long as this operation results solely in the drawing of the wires without destroying the brazed joints between the wires at the nodes of the network.

Finally, the grating can be made of any material suitable for its use during tests in the nuclear reactor.

We claim:
1. A method for filtering a liquid circulating in a primary cooling circuit of a nuclear reactor, during hot-running tests on said reactor before it is commissioned and before a core of said reactor is loaded on a core supporting plate of said reactor, comprising passing said liquid through at least one metal grating fixed on said core supporting plate, said metal grating being in the form of a spherical dome having a height substantially equal to one-quarter of the diameter of its base, and made of drawn wires of hyperquenched stainless steel brazed to one another at each of nodes of said grating.

2. A method according to claim 1, wherein said grating (10) comprises stainless steel wires (15) of a diameter of $10^{-3}$ m and a square mesh having an aperture the side of which has a length of $2 \times 10^{-3}$ m.

3. A method according to claim 1, wherein said grating is obtained by distorting or stamping a woven metal gauze having wires previously brazed to one another at each of nodes of a network of said gauze and hyperquenched from brazing temperature.

* * * * *